United States Patent [19]

Caporiccio et al.

[11] Patent Number: 5,457,158
[45] Date of Patent: Oct. 10, 1995

[54] BLENDS BASED ON FLUOROSILICONE ELASTOMERS AND VINYLIDENE FLUORIDE POLYMERS

[75] Inventors: Gerardo Caporiccio, Milano, Italy; Liberato Mascia, Loughborough, United Kingdom

[73] Assignee: Dow Corning Corporation, Midland, Mich.

[21] Appl. No.: 273,248

[22] Filed: Jul. 11, 1994

[30] Foreign Application Priority Data

Mar. 7, 1994 [IT] Italy ................. MI94A00411

[51] Int. Cl.⁶ .................. C08L 27/16; C08L 83/08
[52] U.S. Cl. .................. 525/102; 525/104; 525/281; 525/283; 525/286
[58] Field of Search .................. 525/104, 102, 525/281, 283, 306

[56] References Cited

U.S. PATENT DOCUMENTS

| | | | |
|---|---|---|---|
| 3,415,900 | 12/1968 | Robb | 525/104 |
| 3,538,028 | 11/1970 | Morgan | 525/104 |
| 4,015,057 | 3/1977 | Gall | 525/104 |
| 4,028,431 | 6/1977 | Futami et al. | 525/104 |
| 4,260,698 | 4/1981 | Tatemoto et al. | 525/102 |
| 4,268,414 | 4/1981 | West | 525/102 |
| 4,314,043 | 2/1982 | Kojima | 525/102 |
| 4,386,170 | 5/1983 | Monroe | 525/102 |
| 4,985,483 | 1/1991 | Saito et al. | 525/104 |
| 5,132,366 | 7/1992 | Kashida et al. | 525/102 |
| 5,367,023 | 11/1994 | Caporiccio et al. | 525/102 |

FOREIGN PATENT DOCUMENTS

| | | | |
|---|---|---|---|
| 56-50948 | 5/1981 | Japan | 525/102 |
| 60-58455 | 4/1985 | Japan | 525/104 |
| 783311 | 12/1980 | U.S.S.R. | 525/102 |

*Primary Examiner*—Ralph H. Dean
*Attorney, Agent, or Firm*—James E. Bittell

[57] ABSTRACT

A process is described for preparing blends of fluorocarbon plastomers such as vinylidene fluoride polymers with fluorosilicone elastomers to obtain materials having a unique combination of flexibility at low temperature and high mechanical strength. Vinylidene fluoride polymer is first exposed to radiation and then mixed with the fluorosilicone. Coagents such as diallylphtalate and triallylisocyanurate are also used to assist in grafting and compatibilizing the two polymers.

18 Claims, No Drawings

BLENDS BASED ON FLUOROSILICONE ELASTOMERS AND VINYLIDENE FLUORIDE POLYMERS

BACKGROUND OF THE INVENTION

The invention relates to a process for preparing blends of plastomer type vinylidene fluoride copolymers and fluorosilicone polymers. The blends have improved flex life at low temperature and are useful for lining, coating and jacksting of electrical and optical cables, films and piezelectric items.

It is well known that the polymers and copolymers of vinylidene fluoride of plastomer type are useful materials for lining and coating applications where weather and UV resistance are needed. Their range of applications would be much wider if they exhibited flexibility at temperatures substantially lower than −30° C.

At normal service temperatures, fluoroelastomers such as plastomer type vinylidene fluoride copolymers have higher mechanical properties than fluorosilicone elastomers. However, fluorosilicone elastomers are known for outstanding low temperature properties which are better even than the carbon fluoroelastomers. Also, the fluorosilicone elastomers exhibit better chemical resistance than dimethylsilicone elastomers.

It is also known to try to improve the processability of VDF based gums, in particular the extrudability, by adding a fluorosilicone gum before curing. The curing is effected by using an organic peroxide, and optionally a cocuring agent (or coagent) to obtain a higher cure rate or better compression set. However, the properties at low temperature of the fluorocarbon elastomers in terms of glass transition temperature have not been changed. Experiments carried out by the Applicant have shown that the flexibility at low temperatures of VDF-based plastomers is not improved by adding fluorosilicone elastomers by the method of blending described in the case of VDF-based gums.

It has, surprisingly and unexpectedly, been found that the flexibility at low temperatures of −30° C. or below, of the VDF based copolymers of plastomer type can be improved by using fluorosilicone gums while still maintaining the good mechanical properties of the VDF-type plastomer. The above results are obtained by using the process of mixing the two polymers as described in the present invention.

The advantages of the present invention are obtained by blending a VDF plastomeric copolymers B with a fluorosilicone elastomer A in the presence of a coagent C. However, the VDF plastomeric copolymer is blended with fluorosilicone elastomer A only after the VDF-based plastomer B has been irradiated. The preblending irradiation step was unexpectedly found to be required to produce the improved materials of this invention.

An object of the present invention is therefore to prepare blends of VDF-based plastomer and a fluorosilicone elastomer where the blends are rich in the VDF-based plastomer. The process comprises exposing a composition comprising a VDF-based plastomer B to radiation, mixing a coagent C at a temperature of 80° to 165° C., with the composition comprising a VDF-based plastomer B before or after exposing B to radiation to provide a weight ratio of C/B from 0.05 to 0.4 where coagent C is a polyunsaturated compound capable of grafting to B, forming the blend after the exposure of B to radiation, by mixing 5 to 46 parts by weight of fluorosilicone gum A with 54 to 95 weight parts of the mixture of C and B with the sum of A+B+C being 100 weight parts and A/B equal to 0.05 to 0.9, optionally during the mixing of A with the mixture of B and C, adding a free radical initiator ($I^1$) characterized by a half life time of about 1 hour at a temperature equal or lower than 95° C., heating the mixture of A, B, C and ($I^1$) at a temperature of 80° to 140° C., optionally adding one or more additives selected from the group consisting of stabilizers, colorants, fillers, basic-oxides, and lubricants, adding a free radical initiator ($I^2$) to the blend where the free radical initiator is characterized by a half life time of about 1 hour at a temperature equal or higher than 135° C. and heating to crosslink the blend.

In general in the VDF-based plastomer rich blends, the VDF plastomer B ranges from 54 to 95% by weight and, by weight, is always in higher amounts than the fluorosilicone elastomer A.

The preferred weight ratio of A/B is 0.1–0.45, of C/B is 0.1 to 0.2.

The preferred range of fluorosilicone elastomer A is 10–30% by weight.

By additives it is meant basic oxides, stabilizers, colorants, lubricants, etc. as well known in the field of fluorinated plastomers.

The irradiation is carried out by using high energy radiation, preferably a γ-rays $Co^{60}$ source or electron beam. The total dose of a $Co^{60}$ source is up to 15 Mrad, preferably in the range 1 to 5 Mrad, at a dose rate of 0.1 Mrad/hour, preferably by exposing to a source with a dose rate of 0.1 Mrad/hour, preferably for 15 hours.

The fluorosilicone elastomer A has the following formula $$T-O[R_FC_nH_{2n}Si(CH_3)-O]_p[R'(CH_3)SiO]_gT \quad (I)$$

where g is zero or a number different from zero p is a number different from zero R' is methyl, or phenyl, or vinyl, or hydrogen n is 2 or 3

$R_F$ is a perfluoralkyl group containing from 1 to 8 carbon atoms

T is H, or $-SiR'(CH_3)_2$ the weight average molecular weight being generally in the range of 100,000 to 800,000, preferably 150,000 to 700,000. The elastomers where $R_F$ is equal to $CF_3$ or $C_4F_9$ are produced by Dow Corning Corporation, U.S.A.

The vinylidene fluoride based plastomer B is:

polyvinylidene fluoride or a plastomer copolymer vinylydene fluoride-tetrafluoroethylene (VDF-TFE)

or a plastomer copolymer vinylidene fluoride-hexafluoropropene (VDF-HFP)

or a plastomer copolymer vinylidene fluoride-tetrafluoroethylene-hexafluoropropene (VDF-TFE-HFP).

The plastomers are commercially available from Atochem North America, subsidiary of Atochem France, the weight average molecular weight being generally in the range of 100,000 to 800,000, preferably 130,000 to 600,000.

The plastomers, as it is well known, show a certain degree of crystallinity and have therefore a defined melting point range. Generally the homopolymers have a melting temperature ranging from 156° to 170° C., the copolymers VDF/TFE from 122° to 126° C., the copolymers VDF/HFP from 140° to 145° C.

The reactive coagent C is preferably selected from diallyl phthalate (DAP) or triallylisocyanurate (TAIC) both available from Aldrich Chemical or their mixtures.

More preferably the component C was a mixture of DAP and TAIC in a weight ratio from 1/3 to 3.

The blend of B with C and A is effected for example in a Brabender Plastograph mixer PL 35 having the jacket at controlled temperatures for example in the range of 130°–165° C. The blending was effected preferably at about 140° C.

When the radical initiator $I^1$ is present, the mixing time is generally 1–15 minutes, depending on the temperature generally ranging from 80° to 140° C. $I^1$ radical initiators are for example peroxide such as benzoylperoxide and lauroylperoxide. The weight ratio of $I^1$ to the plastomer B is in the range $2 \times 10^{-3}$ to $4 \times 10^{-2}$.

The $I^2$ radical type of initiators are characterized by having a one hour half life at a temperature of at least 135° C. Preferably the $I^2$ initiators are selected from dicumyl peroxide; di-t-butyl peroxide; 2,5-bis(t-butylperoxy)-2,5-dimethylhexyne-3 (LUPERSOL®130), 2,2-bis(t-butylperoxy)-1,4-diisopropylbenzene. The weight ratio of the initiator ($I^2$) to the blend of polymers was in the range of 0.01 to 0.04 weight part for 100 parts by weight of A+B+C.

The preferred embodiment of the process comprised the following steps:

Step 1 Premixing:

The VDF based plastomer B was mixed with a certain amount of the reactive coagent C, by means of a high speed blade mixer and then the mixture aged at 85° C. for 24 hours in an oven or by means of a mixer Brabender Plastograph PL35 whose jacket temperature was maintained in the range of 130°–165° C. According to the preferred procedure the composition of the component C was a mixture of DAP and TAIC.

Step 2 Preirradiation:

The VDF-plastomer B or the mixture B+C was irradiated by means of a $Co^{60}$ γ source with a total dose up to 1.5 Mrad, preferably by exposing to a source with dose rate of 0.1 Mrad/h for preferably 15 hours.

Step 3 Preparation of Fluoroplastomer Rich Blends:

The above irradiated mixture of plastomer B with reactive coagent C was blended with a low amount of fluorosilicone elastomer to obtain a plastomer rich blend for a period of 10–15 minutes by means of the Brabender Plastograph mixer PL35 whose jacket temperature was controlled in the temperature range of 130°–165° C., optionally with another amount of component C, and with a radical initiator of a selected class ($I^1$) characterized by a half life of 1 hour at a temperature equal or lower than 95° C. The weight ratio of the components A/B was maintained in the range indicated above. The mixture was blended by the preferred procedure at 130°–140° C., for a period of 10 minutes or 15 minutes when the radical initiator ($I^1$) was present. Then optionally, there was added to the mixture from 2–4 parts of oxides such as CaO, MgO, ZnO, PbO, $Fe_2O_3$, barium zirconate and/or other additives well known in this field, in a ratio of 2–4 parts for 100 parts by weight of A+B+C. Then $I_2$ is added as indicated above and homogenized, preferably while maintaining the temperature of the Brabender at 160° C. for 10 minutes.

Step 4 Crosslinking:

The final mixture was cured by heating it between the plates of a Carver type press heated at a temperature of 170° C. to 190° C. for a period of 5 to 30 minutes, preferably for 10–20 minutes under a pressure of 20–50 tons; in an alternative procedure the mixture obtained from Steps 3 was extruded in a shaped profile by means of a twin screw extruder heated at programmed temperature from 140° to 165° C. and then cured in an autoclave at 180° C. for 10–30 minutes at a pressure of 1 to 50 atmospheres of nitrogen.

Examples 1 to 7 with comparative examples $C_0$–$C_5$ illustrate the fluoroplastomer-rich blends.

By using the process of the present invention it is possible to increase the mechanical properties and resistance to solvents both at room temperature and at high temperatures of fluorosilicone (gum) elastomer by blending it with a proper amount of VDF-copolymer of the plastomer type.

It is well known that the fluoroelastomers are very resistant to the action of hydrocarbon solvents in comparison with the hydrogenated elastomers. Consequently the chemical resistance of the commercial fluorosilicone is expected to be more affected by the action of that class of solvent due to their lower content of fluorine (36% F) in comparison with the vinylidene fluoride copolymer elastomers (65–70% F).

One object of the present invention was to develop fluorosilicones suitable for use in membranes, tubes and O-rings where properties are required such as high resistance and low permeability to oils and fuels containing polar additives for high temperatures, and improved mechanical strength and flexibility.

According to the present invention, it was possible to obtain a surprising and unexpected improvement of both mechanical and chemical resistance of the fluorosilicone elastomers by blending a fluorosilicone rubber A, with a vinylidene fluoride plastomeric polymer B rich blend as obtained before. Particularly in order to obtain a fluorosilicone-rich blend of the present invention, the previous plastomeric rich mixture obtained at the end of step 3 is mixed at a specified temperature with another portion of the fluorosilicone component A. Then, optionally, reinforcing fillers and other additives well known in the fluorosilicone technology can be added. The final mixture is crosslinked as indicated in step 4 in a shaped form by heating under the plates of a press or in an oven to prepare O-ring, membranes, or tubes. The fluorosilicone rich blends contains 5–46% by weight of VDF-plastomer B, preferably 10–35%. In particular the weight ratio C/B ranges from 0.05 to 0.4, preferably from 0.1 to 0.2. The weight ratio A/B ranges from 1.1 to 18, preferably from 1.5 to 8.

The curing of the blends can be effected with different systems other than the radical initiator of the class $I^2$, e.g., using the platinum catalyzed crosslinking well known in silicone technology or other similar systems based on the multifunctional crosslinkers also known in silicone curing technology.

In the preferred embodiment the fluorosilicone rich blend can be prepared as follows:
Steps 1 to 3 as before; then Step $3^1$ Preparation of Fluorosilicone Rich Blends: the plastomer rich blend obtained in step 3 was mixed in a Brabender at a selected temperature in the range of 130°–165° C. for 10 minutes with a further amount of fluorosilicone component A. A free radical initiator ($I^2$), if not added in step 3, can be added alternatively with the further amount of fluorosilicone compound of step $3^1$.

$I^2$ belongs to the class having a one hour half life at a temperature of at least 135° C., preferably selected from dicumyl peroxide; di-t-butyl peroxide; 2,5-bis(t-butylperoxy)-2,5-di-methylhexyne-3 (LUPERSOL®130), 2,2-bis(t-butylperoxy)-1,4-diisopropylbenzene. The weight ratio of the initiator ($I^2$) to the blend of polymers was in the range of 0.01 to 0.04 weight part for 100 parts by weight of A+B+C. The final weight ratio of the components A/B at the end of the step $3^1$ in the elastomer rich blend was included in the range 1.1 to 18, preferably 1.5 to 8.

Then step $3^2$ for adding the reinforcing agent is carried out.

Step 3²: Formulation with Filler Reinforcing Agents, Stabilizers, Additives.

In typical formulations 100 parts of the mixtures obtained at the end of step 3¹ were blended with 10–30 parts of silica or optionally with a mixture of silica and carbon MT (medium thermal type). Optionally, the oxides type indicated in step 3 can be added in this step 3², when not present in step 3. The final step of crosslinking can be performed as indicated above in step 4.

The examples 8 and 9 with comparison examples $C_{6a}$, $C_6$ and $C_7$ show fluorosilicone rich blends.

Analysis and characterization of the blends

Several measurements were made at the subsequent steps. For instance the variation of melting point and of the heat of fusion were measured by D.S.C. The data for the blends of the present invention showed a decay of crystallinity of the plastomeric component B in the blend.

Samples of the crosslinked items were tested for solvent resistance, e.g., by immersion for 72 hours at 25° C. in n-butylacetate and rating the swelling effect by measuring the weight increase. The cured items were tested for residue gel content by exposing a sample entrapped in a 300 mesh stainless steel wire net to refluxing cyclohexanone at 155° C. for 6 hours and weighing the residue after evaporation of the solvent under vacuum at 90° C.

The mechanical properties of the cured items were measured by a tensiometer type Instron. The specimens were also examined by SEM after freeze-fracturing in liquid nitrogen.

The co-crosslinked blends obtained according to the present invention exhibited improved tensile strength at break and improved chemical resistance. Upon examination of the sample by scanning electron microscope, the plastomer VDF component appeared micro dispersed and showed areas of continuity with the areas of the elastomeric fluorosilicone component due to the compatibilizing effect of the grafted reactive coagent.

The following examples are given only for illustrative purposes and not to limit the scope of the invention.

VDF Rich Blends

Examples 1, 2, 3 and comparative examples $C_0$, $C_1$, $C_2$

Example 1

A first sample of 54.5 weight parts (wp) of a VDF plastomer, (a copolymer VDF-TFE (KYNAR® 7201 from Atochem -S.A.) having a weight average molecular weight of 165,000, a melting temperature of 123° C. and a heat of second fusion of 39 joule/g determined during the second heating cycle on a DuPont 2000 termoanalyzer with a heating rate of 10°/minute under nitrogen) was irradiated with γ-rays Co⁶⁰ source for 15 hours using a dose rate 0.1Mrad/hour. Then the powder was mixed using a high speed blade mixer with 9.1 wp of triallylisocyanurate (TAIC) at 85° C. and aged 24 hours at 85° C.

Example 2

A second sample of 54.5 wp of the copolymer KYNAR® 7201, also irradiated with 1.5 Mrad total dose was mixed and aged at 85° C. for 24 hours with 4.55 wp of TAIC and 4.55 wp of diallyl phthalate (DAP).

Example 3

A third sample of 54.5 wp of copolymer identified as KYNAR® 7201 irradiated with 1.5 Mrad γ-rays was mixed with 4.55 wp of triallyl isocyanurate (TAIC) and 4.55 wp of diallyl phthalate (DAP) by means of a high speed blade mixer, then mixed with 0.25 wp of benzoyl peroxide, and heated at 85° C. for 24 hours.

Blending with the fluorosilicone elastomers

The final mixtures 1, 2 and 3 were separately blended into a Brabender Plastograph mixer type PL35 with a thermostatically controlled jacket temperature at 140° C. and running at 100 rpm. Each mixture was further melt blended for 10 minutes at 140° C. with 36.4 wp of fluorosilicone gum of formula I, a hydroxy terminated copolymer of 99.4% 3,3, 3-trifluoropropylmethylsiloxane units and 0.6% methylvinylsiloxane units, having a weight average molecular weight of 600,000.

The mixtures were discharged from the mixer, allowed to remain overnight under ambient conditions, and then characterized by DSC and compared (comparative example $C_0$) with a specimen of KYNAR® 7201 irradiated with 1.5 Mrad total dose from Co⁶⁰ source with the results reported in Table 1.

Comparative example $C_2$):

A 60:40 weight ratio mixture of KYNAR® 7201 and fluorosilicone gum I, both of example 1, melt blended for 10 minutes at 140° C. in the Brabender mixer.

Comparative example $C_2$):

A 54.5:36.4:9.1 weight ratio mixture of, respectively, KYNAR® 7201, fluorosilicone gum I, both of example 1, TAIC; melt blended for 10 minutes at 140° C. in the Brabender mixer.

Characterization

Table 1 reports the DSC results, melting temperature ($T_m$) and heat of second fusion ($H_f$) using a heating rate of 10° C./minute:

TABLE 1

| | Ex. 1 | Ex. 2 | Ex. 3 | $C_0$ | $C_1$ | $C_2$ |
|---|---|---|---|---|---|---|
| Peak $t_m$ °C. | 114.0 | 112.6 | 114 | 123.0 | 123.1 | 113.7 |
| $H_f$ (J/g) | 19.6 | 18.9 | 16.3 | 38.5 | 22.6 | 20.5 |

From the comparison data it can be concluded there was a compatibilizing effect induced by DAP and TAIC, as related to the decreasing crystallinity of mixtures, a synergism exhibited by a mixture of DAP and TAIC in comparison with either one of these alone, and an improved compatibility in the ingredients due to the preirradiation of the plastomer B before blending it with the reactive coagent C.

Example 4

60 weight parts of powder copolymer KYNAR® 7201 of Example 1 (a vinylidene fluoride-tetrafluoroethylene copolymer) were irradiated with Co⁶⁰ 1.5 Mrad total dose, mixed using the high speed blade mixer of Example 1 with 5 wp of triallylisocyanurate (TAIC) and 5 wp of diallyl phthalate (DAP) at 85° C. for 24 hours. The final mixture was further blended for 10 minutes in the Brabender Plastograph running at 60 rpm at 160° C. The temperature was reduced to 130° C. and 0.2 wp of benzoyl peroxide was blended for 5 minutes, then 30 wp of fluorosilicone gum I of example 1 containing 0.6 mole percent of vinyl groups, and 4 wp of a 1:1 weight ratio mixture MgO:CaO, 1 wp of 2,5-bis(t-butylperoxy)- 2,5-dimethylhexyne-3 (LUPERSOL® 130), were mixed at 160° C. for 10 minutes. The final mixture was immediately placed between the steel plate of a press of Step 4 heated at 180° C. and after preheating for 3 minutes, a pressure of 18 MPa was applied for 20 minutes. During the subsequent cooling the mold was kept under pressure to prevent distortion.

Characterization

A 50 mg sample was cut from the molded sheet, wrapped in a 300 mesh stainless steel wire net of known weight and extracted under reflux at 155° C. with cyclohexane for 5 hours. After drying to constant weight under vacuum at 90° C. the residue contained 45.7% of a gel fraction, net from inorganic additives. Dumbell shaped specimens were cut from the molded sheet and the tensile tests were carried out according to ASTM test method D638 using an extension rate of 50 mm/minute. The tensile strength at break was 11.8 MPa and the elongation was 71%. Thermal analysis was performed using a DuPont 2000 differential scanning calorimeter at a heating rate of 10° C. per minute under nitrogen purge. The results were a peak melting temperature $t_m$ at 122° C.

Using a Dynamic Mechanical Thermal Analyzer (Model PL706 available from Polymer Labs) a glass transition temperature of −51° C. and a stiffening temperature of −37° C. were determined respectively from the peak value of the curve tan-delta versus temperature and from the intersection point of the tangent of the storage modulus curve versus temperature with the asymptotic base line at the rubbery plateau. (see T. MURAYAMA, "Dynamic mechanical analysis of polymeric materials", ELSEVIER publ., 1978, page 61).

The characterization data are reported in Table 2.

Example 5 and Comparative Examples $C_3$ and $C_4$

Using the same equipment and procedures described in example 4, and the same ingredients in the same relative proportion, with the exception that a 60:5:5 weight ratio of KYNAR® 7201:TAIC:DAP was prepared using the blade mixer at a temperature of 85° C. and the mixture was irradiated with a 1.5 Mrad dose of γ-rays. The properties of the samples are reported in table 2 together with the properties of a 100% copolymer KYNAR® 7201 (comparative example $C_3$) and a blend of 33 weight percent fluorosilicone gum I of example 1 and 67 weight percent KYNAR® 7201, crosslinked with 1% of LUPERSOL® 130 (comparative example $C_4$).

TABLE 2

|  | Ex. 4 | Ex. 5 | $C_3$ | $C_4$ |
| --- | --- | --- | --- | --- |
| Gel fraction, wt % | 46 | 70 | 0 (KYNAR 7201) | ND |
| Tensile strength, MPa (break) |  |  |  |  |
| 23° C. | 11.8 | 12.4 | 23 | 4.9 |
| −40° C. | 30 | 35.3 | 50 | 18 |
| Elongation at break % |  |  |  |  |
| 23° C. | 71 | 45 | 17 | 17 |
| −40° C. | 35 | 27 | 100 | 8.5 |
| Tg °C. | −51 | −42 | −30 | −32 |
| Stiffening temperature °C. | −37 | −39 | −26 | −27 |

Example 6

Test samples were prepared using the same equipment, procedure and ingredients of example 4, and a 80:5:5 weight ratio mixture of copolymer KYNAR® 7201, TAIC, DAP, then it was irradiated with 1.5 Mrad of γ-rays (Co⁶⁰) and blended with 10 wp of fluorosilicone gum I of example 1, 0.2 wp of dibenzoyl peroxide, 4 wp of a 1:1 weight ratio mixture of MgO and CaO, and 1 part of LUPERSOL® 130.

The blending at 160° C. in the Plastograph and curing at 180° C. were carried out for the same time periods described in example 4.

Using the measuring techniques described in example 4, the test sample of molded crosslinked products exhibited a gel fraction of 66%, a tensile strength at break of 18 MPa, elongation at break 14%, melting temperature of 120° C., a glass transition temperature of −53° C., and a stiffening temperature of −30° C.

Example 7 and Comparative Example $C_5$

Using the same equipment and procedures described in example 4, an 80:5:5 weight ratio mixture of polyvinylidene fluoride (KYNAR® 461 from Atochem having a weight average molecular weight of 550,000) TAIC and DAP was irradiated with γ-rays at total dose of 1.5 Mrad, followed by mixing in the Brabender Plastograph with fluorosilicone gum I of example 1 at 170° C. for 10 minutes, decreasing the temperature to 160° C., adding 1 weight percent of LUPERSOL® 130 and mixing for 3 minutes. The blend was cured in the press at 180° C. for 20 minutes at 16 MPa.

Specimens of the molded product were analyzed as described in the preceding examples and are reported together with the results for pure KYNAR® 461 (comparative example $C_5$) in table 3. Moreover, the crystallinity of the blend, obtained from fusion enthalpy data from the DSC thermogram and normalized to the weight percent of KYNAR® 461 present in the mixture, was 20% lower than for the pure KYNAR® polymer.

TABLE 3

|  | Ex. 7 | Comp. ex. $C_5$ |
| --- | --- | --- |
| Gel Fraction (155° × 6h) wt % | 68 | 0 |
| Tensile strength at break, at 23° C. (MPa) | 35 | 34 |
| Elongation at break at 23° C, (%) | 14 | 14 |
| Glass transition temperature °C. | −50 | −32 |
| Stiffening Temperature °C. | −30 | −22 |

Fluorosilicone Rich Blends

Example 8

Samples were prepared using the same equipment and general procedure of example 4. 30 wp of KYNAR® 7201 copolymer of example 1, 5 wp TAIC, 5 wp DAP were irradiated with 1.5 Mrad. Then mixed with 60 wp fluorosilicone gum I of example 1 in the Brabender for 10 minutes at 160° C., cooled to 130° C., blended with 0.2 wp benzoyl peroxide, 1 wp of LUPERSOL® 130, and 4 wp of a 1:1 weight ratio mixture of MgO:CaO, and then cured at 180° C. for 20 minutes in a press under 18 MPa pressure.

The properties of the crosslinked product are reported in table 4, the swelling (%) was 62.3.

Comparative Example $C_{6a}$

A blend of 90 wp of fluorosilicone gum I of example 1, 5 wp TAIC, 5 wp DAP, 0.2 wp benzoylperoxide, 4 wp of MgO and CaO (50−:50 by weight), and 1 wp LUPERSOL® 130 was prepared and cured as described in example 8. The properties of the cured product are reported in table 4, the swelling (%) was 162.

Example 9

Test samples were prepared using the same equipment, procedures and types of ingredients described in example 8. A polymer blend contained 51 wp of the fluorosilicone gum I of example 1, 9 wp of fumed silica; 30 wp of KYNAR® 7201 and 5 wp TAIC and 5 wp DAP which had been preirradiated with 1.5 Mrad of radiation. The amounts of benzoyl peroxide, MgO, CaO, LUPERSOL® 130 described in example 8 were then added, following which the mixture was cured in the press. The properties of the cured material are reported in table 4; the swelling (%) was 52.

Comparison examples $C_6$ and $C_7$

Test samples were prepared using the ingredients listed in table 5 using pure polymers without the coagent C and not preirradiated. MgO, CaO and LUPERSOL® 130 were added in the reported amounts and the mixture was blended and cured as described in examples 8–9. The properties of the cured slabs are reported in table 4. In $C_6$ the swelling (%)

was 221; in $C_7$, it was 143.

TABLE 4

|  | Ex. 8 | $C_{6a}$ | Ex. 9 | $C_6$ | $C_7$ |
|---|---|---|---|---|---|
| Gel fraction * | 40 | 26 | 67 | 5,6 | 6.7 |
| Tensile strength at break (MPa) at 23° C. | 5 | 0.5 | 5.2 | 0.3 | 0.8 |
| Elongation at break at 23° C. (%) | 61 | 123 | 37 | 133 | 55 |
| Melting Temperature, °C. | 121 | none | 120.5 | none | 122 |
| Glass Transition, °C. | −43 | −44.5 | −42 | −52 | −45.6 |
| Stiffening Temp., °C. | −42 | −49 | −45 | −53 | −50 |

* = Net from inorganic materials

TABLE 5

|  | $C_6$ | $C_7$ |
|---|---|---|
| Fluorosilicone Gum I | 100 | 70 |
| KYNAR ® 7201 (VDF-TFE) | — | 30 |
| MgO, CaO (50:50) | 4 | 4 |
| LUPERSOL ® 130 | 1 | 1 |

That which is claimed:

1. A process for preparing blends of vinylidene fluoride-based elastomer and a fluorosilicone elastomer where the blends are rich in the vinylidene fluoride-based elastomer, the process comprising exposing a composition comprising a vinylidene fluoride-based elastomer B to radiation, mixing a coagent C at a temperature of 80° to 165° C., with the composition comprising a vinylidene fluoride-based elastomer B before or after exposing B to radiation to provide a weight ratio of C/B from 0.05 to 0.4 where coagent C is a polyunsaturated compound capable of grafting to B, forming the blend after the exposure of B to radiation, by mixing 5 to 46 parts by weight of fluorosilicone gum A with 54 to 95 weight parts of the mixture of C and B with the sum of A+B+C being 100 weight parts and A/B equal to 0.05 to 0.9, optionally during the mixing of A with the mixture of B and C, adding a free radical initiator ($I^1$) characterized by a half life time of about 1 hour at a temperature equal or lower than 95° C., heating the mixture of A, B, C and ($I^1$) at a temperature of 80° to 140° C., optionally adding one or more additives selected from the group consisting of stabilizers, colorants, fillers, basic-oxides, and lubricants, adding a free radical initiator ($I^2$) to the blend where the free radical initiator is characterized by a half life time of about 1 hour at a temperature equal or higher than 135° C. and heating to crosslink the blend.

2. A process according to claim 1, wherein the composition comprising vinylidene fluoride-based elastomer B is exposed to radiation from a gamma-source.

3. A process according to claim 2, in which the total dose of radiation is up to 15 Mrad.

4. A process according to claim 3 in which the total dose of radiation is form 1 to 5 Mrad.

5. A process according to claim 4 wherein the fluorosilicone elastomer has the formula

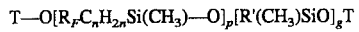  (I)

where
g is zero or a number different from zero
p is a number different from zero
R' is methyl, or phenyl, or vinyl or hydrogen
n is 2 or 3
$R_f$ is a perfluoroalkyl group containing form 1 to 8 carbon atoms
T is H, or $SiR'(CH_3)_2$
the weight average molecular weight being in the range of 100,000 to 800,000.

6. A process according to claim 5, wherein the vinylidene fluoride based elastomer B is polyvinylidene fluoride or a copolymer of vinylydene fluoride-tetrafluoroethylene or a copolymer of vinylidene fluoride-hexafluoropropene or a copolymer of vinylidene fluoride-tetrafluoroethylene-hexafluoropropene; the weight average molecular weight being in the range of 100,000 to 800,000.

7. A process according to claim 6, wherein the reactive component C is diallyl phthalate or triallylisocyanurate.

8. A process according to claim 7, wherein the component C is a mixture of diallyl phthalate and triallylisocyanurate in a weight ratio from 1/3 to 3.

9. A process according to claim 8, wherein $I^1$ radical initiator is an organic peroxide.

10. A process according to claim 9, wherein the vinylidene fluoride-based elastomer B is mixed with the coagent C prior to exposing it to radiation.

11. A process according to claim 10, wherein the free radical initiator ($I^2$) is an organic peroxide selected from dicumyl peroxide; di-t-butyl peroxide; 2,5-bis(t-butylperoxy)- 2,5-dimethylhexyne-3 and 2,2-bis(t-butylperoxy)-1,4-diisopropylbenzene, the weight ratio of the initiator ($I^2$) to the blend being in the range of 0.01 to 0.04 weight part for 100 parts by weight of the blend of A+B+C.

12. A method of coating a substrate with a material retaining elastomeric properties at temperatures of less than −30° C. comprising coating a substrate with the vinylidene fluoride-elastomer rich blend obtained according to the process of claim 1.

13. Vinylidene fluoride-elastomer rich blends obtained according to the process of claim 1.

14. A process for the preparation of blends rich in fluorosilicone elastomer, the process comprising mixing a fluorosilicone gum A with a blend rich in vinylidene fluoride-based elastomer B, where the blend rich in vinylidene fluoride-based elastomer is obtained by exposing a composition comprising a vinylidene fluoride-based elastomer B to radiation, mixing a coagent C at a temperature of 80° to 165° C., with the composition comprising a vinylidene fluoride-based elastomer B before or after exposing B to radiation to provide a weight ratio of C/B from 0.05 to 0.4 where coagent C is a polyunsaturated compound capable of grafting to B, forming the blend after the exposure of B to radiation, by mixing 5 to 46 parts by weight of fluorosilicone gum A with 54 to 95 weight parts of the mixture of C and B with the sum of A+B+C being 100 weight parts and A/B equal to 0.05 to 0.9, optionally during the mixing of A with the mixture of B and C, adding a free radical initiator ($I^1$) characterized by a half life time of about 1 hour at a temperature equal or lower than 95° C., heating the mixture of A, B, C and ($I^1$) at a temperature of 80° to 140° C., optionally adding one or more additives selected from the group consisting of stabilizers, colorants, fillers, basic-oxides, and lubricants, the vinylidene fluoride-based elastomer being 5–46% by weight of the blend rich in fluorosilicone elastomer and the weight ratio of A/B ranging from 1.1 to 18.

15. A process according to claim 14 wherein the blend rich in fluorosilicone elastomer contains 10 to 35% by weight of vinylidene fluoride-based elastomer.

16. A process according to claim 14 wherein reinforcing fillers are added before crosslinking the blend rich in fluorosilicone elastomer.

17. A method of preparing tubes or O-rings having improved resistance and reduced permeability to oils and fuels at elevated temperatures, the method comprising forming the tubes or O-rings from blend rich in fluorosilicone elastomer prepared by the process of claim 14.

18. The blends rich in fluorosilicone elastomer prepared by the process of claims 14.

* * * * *